(12) United States Patent
Jang et al.

(10) Patent No.: US 9,567,471 B2
(45) Date of Patent: Feb. 14, 2017

(54) INK COMPOSITION AND METHOD FOR FORMING EMBOSSED PATTERN USING THE SAME

(71) Applicants: Hyundai Motor Company, Seoul (KR); Akzonobel Industrial Coatings Korea Ltd., Ansan, Gyeonggi-do (KR)

(72) Inventors: Seon Ho Jang, Gyeonggi-do (KR); Ho Tak Jeon, Gyeonggi-do (KR); Hyon Min Yang, Seoul (KR); Sang Su Kim, Gyeongsangnam-do (KR)

(73) Assignees: HYUNDAI MOTOR COMPANY, Seoul (KR); AKZONOBEL INDUSTRIAL COATINGS KOREA LTD., Ansan, Gyeonggi-do (KR)

( * ) Notice: Subject to any disclaimer, the term of this patent is extended or adjusted under 35 U.S.C. 154(b) by 126 days.

(21) Appl. No.: 14/570,123

(22) Filed: Dec. 15, 2014

(65) Prior Publication Data
US 2016/0009932 A1 Jan. 14, 2016

(30) Foreign Application Priority Data
Jul. 14, 2014 (KR) .................. 10-2014-0088271

(51) Int. Cl.
| | | |
|---|---|---|
| C09D 11/107 | (2014.01) | |
| C08K 5/5419 | (2006.01) | |
| B05D 1/36 | (2006.01) | |
| B05D 5/02 | (2006.01) | |
| B05D 5/06 | (2006.01) | |
| B05D 7/00 | (2006.01) | |
| C09D 11/10 | (2014.01) | |
| B05D 1/32 | (2006.01) | |

(52) U.S. Cl.
CPC ............... *C09D 11/107* (2013.01); *B05D 1/36* (2013.01); *B05D 5/02* (2013.01); *B05D 5/06* (2013.01); *B05D 7/54* (2013.01); *C08K 5/5419* (2013.01); *C09D 11/10* (2013.01); *B05D 1/32* (2013.01)

(58) Field of Classification Search
CPC ............................ C08G 77/442; C08L 101/10
See application file for complete search history.

(56) References Cited

U.S. PATENT DOCUMENTS

2012/0189665 A1* 7/2012 Susak ............... A61K 8/40
424/400

FOREIGN PATENT DOCUMENTS

| JP | 2985536 B2 | 12/1999 |
|---|---|---|
| JP | 2010-069684 A | 4/2010 |
| JP | 2013-199591 A | 10/2013 |
| KR | 10-2006-0080451 A | 7/2006 |
| KR | 10-2009-0054762 A | 6/2009 |
| KR | 10-2010-0101749 A | 9/2010 |
| KR | 1275819 | 6/2013 |

* cited by examiner

*Primary Examiner* — Kuo-Liang Peng
(74) *Attorney, Agent, or Firm* — Mintz Levin Cohn Ferris Glovsky and Popeo, P.C.; Peter F. Corless

(57) ABSTRACT

Disclosed are an ink composition and a method for forming embossments using the ink composition. Accordingly, a process of removing a clear residue on the printed pattern in the related arts may be eliminated. In particular, the ink composition for improving formation of embossment may include: a silane-modified polyacrylate resin in an amount of about 10 to 40 wt %; a silicone-modified polyacrylate resin in an amount of about 50 to 80 wt %; a silicone oil-type additive in an amount of about 3 to 7 wt %; and a silicone oil compound-type additive in an amount of about 5 to 15 wt %. The ink composition has substantially reduced surface tension to provide excellent water-repellency and oil-repellency. As such, a clear paint may not be adhered to the printed pattern surface of the ink composition, but instead, the clear paint may be adhered to the non-printed surface, thereby forming an embossed pattern.

9 Claims, 2 Drawing Sheets

INK COMPOSITION AND METHOD FOR FORMING EMBOSSED PATTERN USING THE SAME

CROSS-REFERENCE TO RELATED APPLICATION

This application claims under 35 U.S.C. §119(a) the benefit of Korean Patent Application No. 10-2014-0088271 filed Jul. 14, 2014, the entire contents of which are incorporated herein by reference.

TECHNICAL FIELD

The present invention relates to an ink composition which improves formation of embossment and a method for forming an embossed pattern using the ink composition. The ink composition used to form an embossed pattern may include: a silane-modified polyacrylate resin, a silicone-modified polyacrylate resin, a silicone oil-type additive, and a silicone oil compound-type additive, such that the surface tension may be substantially reduced on a printed surface by printed by the ink composition to provide improved water-repellency and oil-repellency. As consequence, a clear paint may not be adhered to the printed surface on which an ink is printed, but instead, the clear paint may be adhered to a non-printed surface.

BACKGROUND

When a plastic interior part of a vehicle is processed, finishing step may be performed in two ways on a surface thereof. The vehicle plastic interior parts may be processed to form a smooth surface, or otherwise, the vehicle plastic interior parts may be processed to form an embossed surface. For example, the embossed shape may be formed on the surface of an injection-molded body which by corrosion in a mold for plastic injection molding.

Such examples are usually used for parts for vehicles such as a door trim and a crash pad because the embossed shape may be formed in a single mold for embossing injection, which is similar to finishing leather with embossment formed on the surface by using low-cost plastic injection and painting. When the embossing is formed by the above-mentioned method, the embossed shape may not be modified without modification to the mold such as corrosion modification.

In the related arts, a transparent embossing may not be implemented if a transparent material is not injected, and further although the transparent material may be used, transparent embossing may not be formed by itself when a colored paint is added to the material in order to conceal surface defects, for example, when flow marks or weld lines are generated during the injection.

Meanwhile, in the related arts, a method for making a color coating providing a three-dimensional effect and a color print body by the method have been developed. In particular, a clear paint painted on an ink composition may remain as a residue, such that the embossing may be implemented only when a process of removing the corresponding residue is included. The residue may be removed mechanically using a brush and the like and using an adhesive tape or vacuum suction. However, since the removing process is applied over the entire printed parts, a significant amount of laboring hours may be needed, and thus mass production thereof may not be easily obtained.

Thus, there is a need for an ink composition for improving formation of embossment, thereby improving mass production, eliminating the process of removing a residue from the clear paint in the related art. In addition, because the residue may not remain on the printed parts, workability and cost competitiveness may be improved.

The above information disclosed in this Background section is only for enhancement of understanding of the background of the invention and therefore it may contain information that does not form the prior art that is already known in this country to a person of ordinary skill in the art.

SUMMARY OF THE INVENTION

In one preferred aspect, the present invention addresses one or more of the above-described technical difficulties by using an ink composition including a silane-modified polyacrylate resin, a silicone-modified polyacrylate resin, a silicone oil-type additive, and a silicone oil compound-type additive. The ink composition may have substantially reduced surface tension thereby improving water-repellency and oil-repellency on a printed surface. Accordingly, a clear paint may not be adhered to the printed surface on which the ink composition is printed, but instead, the clear paint may be adhered only to a non-printed surface, such that an embossed pattern may be formed on the only to the non-printed surface. Further, embossing may be easily formed without an additional process to the printed surface to remove the residue from the clear paint.

In one aspect, an ink composition for improving formation of embossment is provided.

In another aspect, a method for forming an embossed pattern using the ink composition is also provided.

In still another aspect, a plastic part which may be used for an interior part of a vehicle may include the embossed pattern implemented by the method for forming an embossed pattern as described above.

In an exemplary embodiment, an ink composition for improving formation of embossment may include: a silane-modified polyacrylate resin in an amount of about 10 to 40 wt %; a silicone-modified polyacrylate resin in an amount of about 50 to 80 wt % based on the total weight of the ink composition; a silicone oil-type additive in an amount of about 3 to 7 wt % based on the total weight of the ink composition; and a silicone oil compound-type additive in an amount of about 5 to 15 wt %, based on the total weight of the ink composition.

In an another preferred aspect, ink composition for improving formation of embossment are provide that may consist essentially of or consist of: a silane-modified polyacrylate resin in an amount of about 10 to 40 wt %; a silicone-modified polyacrylate resin in an amount of about 50 to 80 wt % based on the total weight of the ink composition; a silicone oil-type additive in an amount of about 3 to 7 wt % based on the total weight of the ink composition; and a silicone oil compound-type additive in an amount of about 5 to 15 wt %, based on the total weight of the ink composition.

In an exemplary embodiment, the present invention provides a method for forming an embossed pattern using the ink composition.

In an exemplary embodiment, the present invention provides a plastic part for an interior part of a vehicle, and the plastic part may include an embossed pattern implemented by using the method for forming an embossed pattern as described above.

An ink composition according to various exemplary embodiments of the present invention may be used to form the transparent embossment, which may be differentiated from the embossment formed by injection methods in the related art For example, various embossed patterns may be implemented by using a single injection mold for forming the embossed surfaces through printing and painting on a smooth injection-molded body. Since the injection mold is very expensive, the embossing methods of the present invention may be modified without additional investment and modification, such that when the modification is applied to vehicle interior parts, each of the different embossed patterns may be provided for each specification, thereby improving the effect of differentiated interior parts at reduced costs.

In addition, an additional process in the related art for removing a residue from a clear paint may be eliminated, because the clear paint may not remain on the printed surface when a secondary clear paint is applied. Accordingly, workability may be improved significantly. Furthermore, due to elimination of such steps in the present invention, cost competitiveness may increase.

Other aspects and embodiments of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1:
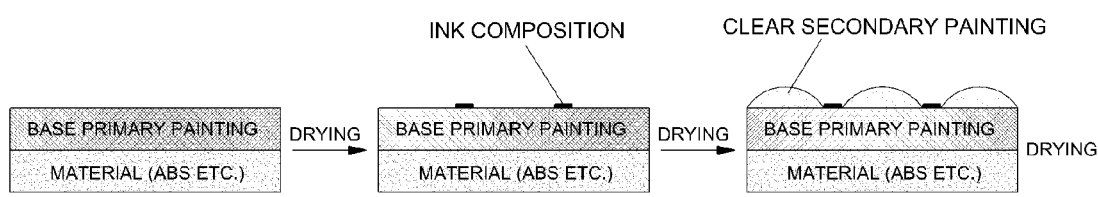
FIG. 1 illustrates an exemplary method for forming an embossed pattern using an exemplary ink composition according to an exemplary embodiment of the present invention.

It should be understood that the appended drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention provides an ink composition and a method for forming an embossed pattern using the ink composition, which may improve water-repellency and oil-repellency. As such, a process of removing a clear residue in the related art may be eliminated.

In particular, a method for forming an embossed pattern using the ink composition may include: a process of performing a pattern printing using the ink composition on a primary base painting, and subsequently, a process of performing a clear secondary painting on the primary base painting. As shown in FIG. 1, the ink composition may reduce surface tension substantially, and thus water-repellency and oil-repellency may be improved accordingly, thereby hindering adherence of the clear painting in the secondary painting process. Accordingly, the clear paint may not be applied on the printed surface, but the clear paint may be applied only on the non-printed surface, thereby forming the pattern. In particular, the primary base painting may be a pad printing using the ink composition.

When the primary painting is performed using the ink composition as described above, mass production may be obtained since the process of removing the residue may be eliminated. Furthermore, the manufacturing cost may be reduced by eliminating processes.

Hereinafter, the present invention will be described in more detail as an exemplary embodiment.

In an exemplary embodiment, an ink composition for enhancing lasting embossment may include: a silane-modified polyacrylate resin in an amount of about 10 to 40 wt %; a silicone-modified polyacrylate resin in an amount of about 50 to 80 wt %; a silicone oil-type additive in an amount of about 3 to 7 wt %; and a silicone oil compound-type additive in an amount of about 5 to 15 wt %, based on the total weight of the ink composition.

The silane-modified polyacrylate resin, as used herein, may be synthesized by a radical polymerization from monomers. The silane-modified polyacrylate resin may include one or more acrylic monomers, and the acrylic monomer may be, but not limited to, selected from the group consisting of methyl methacrylate (MMA), butyl acrylate (BAM), styrene monomer (SM), and 2-hydroxyethyl methacrylate (2-HEMA).

The silane introducing group may be, but not limited to, methacrylate functional alkoxysilane, and particularly, the silane-modified acrylic resin may be synthesized from organosilane, methacryloxypropyltrimethoxysilane, and the like without limitation. It is also appreciated that Dow Corning Z-6030 (Dow Corning, USA) may provide a suitable option for the organosilane and the Sila-Ace S710 (JNC, Japan) may provide a suitable option for methacryloxypropyltrimethoxysilane.

The content of silane in the silane-modified polyacrylate resin may be in an amount of about 5 to 35 wt % based on the total weight of the silane-modified polyacrylate resin. When the content of silane is less than about 5 wt %, stability of the paint such as phase separation may deteriorate, and the pattern of the clear base coat paint may deteriorate. When the content of silane is greater than about 35 wt %, the clear paint may remain on the printed pattern surface of the ink composition, and the printed ink or paint may be in a gel state and solidified within a short time, thereby causing stability defect. Accordingly, the silane may be included in an amount of about 5 to 35 wt % as described above.

In addition, the silane-modified polyacrylate resin may have a glass transition temperature (Tg) of about −20 to 40° C. When the glass transition temperature is less than about −20° C., physical properties such as coating hardness may deteriorate and the clear paint may remain. When the glass transition temperature is greater than about 50° C., physical properties of the coating may be sufficient, but storability may decrease and the clear residue may remain. Accordingly, the silane-modified polyacrylate resin may have the glass transition temperature in a range of about −20 to 40° C. It is also appreciated that a silane-modified acrylate resin manufactured by Anick Co., Ltd. may provide a suitable option for the silane-modified polyacrylate resin in the present invention.

Moreover, the silane-modified polyacrylate resin may be included in an amount of about 10 to 40 wt % of based on the total weight of the ink composition. When the content of the silane-modified polyacrylate resin is less than about 10 wt %, an adhesion release problem may occur. When the content is greater than about 40 wt %, the clear paint may remain. Accordingly, the silane-modified polyacrylate resin may be used in an amount of about 10 to 40 wt % as described above.

The silicone-modified polyacrylate resin, as used herein, may include the content of silicone in an amount of about 10 to 50 wt % based on the weight of the silicone-modified polyacrylate resin, and in particular, a content of OH may be in an amount of about 0.8 to 4% by weight based on the weight of the silicone-modified polyacrylate resin. When the content of silicone is less than about 10 wt %, the pattern residue of the clear base coat may substantially appear. When the content of silicone is greater than about 50 wt %, adhesion to a material, compatibility and stability of the paint may deteriorate. Accordingly, the silicone may be included in a range of about 0.8 to 4% in the resin as described above.

Further, when the content of hydroxide (OH) by weight is greater than 4%, adhesion to a material may deteriorate and storability of the acrylic resin may also deteriorate. When the content of hydroxide is less than about 0.8%, mechanical properties and chemical resistance of the pattern coating may deteriorate. Therefore, hydroxide may be included in a range of about 0.8 to 4% by weight in the resin as described above. It is also appreciated that a silicone-modified polyacrylate resin manufactured from BYK Co., Ltd. may provide a suitable option for the silicone-modified polyacrylate resin of the present invention.

Accordingly, the silicone-modified polyacrylate resin may impart hydrophobicity to the surface of the coating, thereby improving resistance to contamination by providing improved water repellency and oil components. In particular, the adhesion of the contaminants may be substantially reduced to provide easy cleaning, and other properties such as material wetting, a leveling property, a surface slip property, water resistant whitening prevention, adhesion resistance, and weather resistance may be improved substantially.

The silicone-modified polyacrylate may be included in an amount of about 50 to 80 wt % based on the total weight of the ink composition. When the content of the silicone-modified polyacrylate resin is less than about 50 wt %, the clear paint may remain on the printed ink, and when the content is greater than about 80 wt %, printing workability and adhesion thereof may deteriorate. Accordingly, the silicone-modified polyacrylate may be used in a range of about 50 to 80 wt % as described above.

The above described resins including the silane-modified polyacrylate resin and the silicone-modified polyacrylate resin may constitute residue of the ink coating when the solvent is volatilized after the drying process of the ink, as such the above resins may serve as a main skeleton of the ink residue. It is also appreciated that RAU-PS12 resin manufactured from Anick Ltd. may provide a suitable option for the silane-modified polyacrylate resin to improve adhesion to the primary painting surface and reliability, and further may be used in combination with the silicone-modified polyacrylate resin manufactured from BYK Co., Ltd., thereby improving water-repellency and oil-repellency substantially compared to the case when an additive is added in the resin mixture.

The additive, as used herein, may maximize water-repellency and oil-repellency of the ink composition. In particular, as the additive, a silicone oil-type additive having a low surface tension and a silicone oil compound-type additive may be included in the ink composition. It is also appreciated that a silicone oil-type additive (KF-96) manufactured from ShinEtsu Co., Ltd. may provide a suitable option for the silicone oil-type additive of the present invention and a silicone oil compound-type additive (KS66) manufactured from ShinEtsu Co., Ltd. may provide a suitable option for the silicone oil compound-type additive in the present invention.

The silicone oil-type additive may be, but not limited to, a 100% solution of dimethyl silicone oil which may be a colorless, odorless and transparent liquid. In particular, the silicone oil may be substantially chemically inert and may have improved characteristics such as heat resistance, resistance at low temperature, and chemical resistance. Further, the surface tension of the silicone oil may be sufficiently low such that the silicone oil may diffuse substantially on the surface of various materials and may be widely used in a mold release agent, a defoamer, and the like. In addition, the silicone oil may have improved water-repellency particularly during curing process at a high temperature and may be variously used as a water-repellent agent of glass, ceramics, fibers and the like.

The silicone oil compound-type additive may be produced by blending silica micro power and the like with silicone oil as a base oil. The silicone oil compound, as used herein may provide improved thermal oxidation stability, water repellency and the like in a various range of temperatures and thus may be used for the purpose of electrical isolation, heat resistance, water repellency and the like.

The silicone oil-type additive may be included in an amount of about 3 to 7 wt % based on the total weight of the ink composition. When the content of the silicone oil-type additive is less than about 3 wt %, a clear paint may remain with irregular shapes on the ink printed surface, and when the content is greater than about 7 wt %, additional effect in reducing the clear residue may not be obtained as the increase of the silicone oil-type additive content. Accordingly, the silicone oil-type additive may be included in the ink composition in an amount of about 3 to 7 wt % as described above.

The silicone oil compound-type additive may be included in an amount of about 5 to 15 wt % based on the total weight of the ink composition. When the content of the silicone oil compound-type additive is less than about 5 wt %, the clear paint may cover the ink printed surface, and when the content is greater than about 15 wt %, additional effect in reducing the clear residue may not be obtained as the increase of the silicone oil compound-type additive content. Accordingly, the silicone oil compound-type additive may be included in the ink composition in an amount of about 5 to 15 wt % as described above.

In particular, when the silicone oil-type additive is used singly as additive, the clear residue may remain in irregular shapes on the printed surface, and when the silicone oil compound-type additive is used singly as additive, the clear residue may remain with a small circular water drop shape on the printed surface. Accordingly, the silicone oil-type additive in an amount of about 3 to 7 wt % of and the silicone oil compound-type additive in an amount of about 5 to 15 wt % may be used in combination as described above, to prevent the clear paint composition from remaining on the ink printed surface.

The ink composition may further include a curing agent and a solvent. As used herein, the content of the ink composition including the silane-modified polyacrylate resin, the silicone-modified polyacrylate resin, the silicone oil-type additive and the silicone oil compound-type additive is set as 100 parts by weight, unless otherwise indicated. When the curing agent and the solvent are added to the ink composition, the curing agent may be added in an amount of about 10 to 30 parts by weight; and the solvent may be added in an amount of about 1 to 30 parts by weight.

The curing agent may improve physical properties of the printing layer, and to the curing agent may include one or more isocyanate-based curing agents selected from the group consisting of hexamethylene diisocyanate, toluene diisocyanate, and isopropyl diisocyanate.

When the content of the ink composition is set as 100 parts by weight, the curing agent may be added in an amount of about 10 to 30 parts by weight, or particularly in an amount of about 10 to 20 parts by weight to the ink composition. When the content of the curing agent is less than about 10 parts by weight, physical properties may deteriorate since the ink composition may not be sufficiently cured, and when the content of the curing agent is greater than about 30 parts by weight, adhesion strength to the material may be reduced. Accordingly, the curing agent may be used in a range of about 10 to 30 parts by weight as described above.

The ink composition may further include a solvent to improve printing workability. The solvent may be, but not limited to, a hydrocarbon-based solvent such as toluene, xylene, and the like, an ester-based solvent such as normal butyl acetate, isobutyl acetate, cellosolve acetate, and the like, ether-based ethylene glycol monoethyl ether and ethylene glycol monobutyl ether, ketone-based methyl isobutyl ketone, diacetone alcohol, cyclohexanone, and isophorone, and the like.

When the content of the ink composition is 100 parts by weight as described above, the solvent may be added in an amount of about 1 to 30 parts by weight to the ink composition. When the content of the solvent is less than about 1 part by weight, the resin solubility may be reduced, thereby causing resin aggregation or reduced solubility for additives. When the content is greater than about 30 parts by weight, the viscosity may be reduced, such that pad printing workability may deteriorate, and the solid content in the ink composition may be reduced, thereby causing deterioration of a pattern implementation. Accordingly, the solvent may be added in an amount of about 1 to 30 parts by weight to the ink composition as described above.

In an exemplary embodiment of the present invention, a method for forming an embossed pattern using an ink composition may include: (i) performing a pattern printing on a primary base painting by using an ink composition of the present invention; and (ii) performing a secondary painting treatment with a clear paint on the primary base painting with the printed pattern. An exemplary method for forming an embossed pattern may be illustrated in FIG. 1.

Step (i) may be a step of forming an exemplary pattern on the primary base painting by using an exemplary ink composition which may have a substantially reduced surface tension and improve water-repellency and oil-repellency, as illustrated in FIG. 1.

Step (ii) may be a step of performing a secondary painting with a clear paint on the primary base painting with the printed pattern formed in step (i). Since the ink composition in step (i) has a substantially reduced surface tension and has substantial water-repellency and oil-repellency, adherence of the clear paint to the pattern may be hindered as consequence. Accordingly, since the clear paint is not applied on the pattern formed by the ink composition as the printed surface, the clear paint may remain only on the non-printed surface, thereby forming an embossed pattern.

Figure 2:
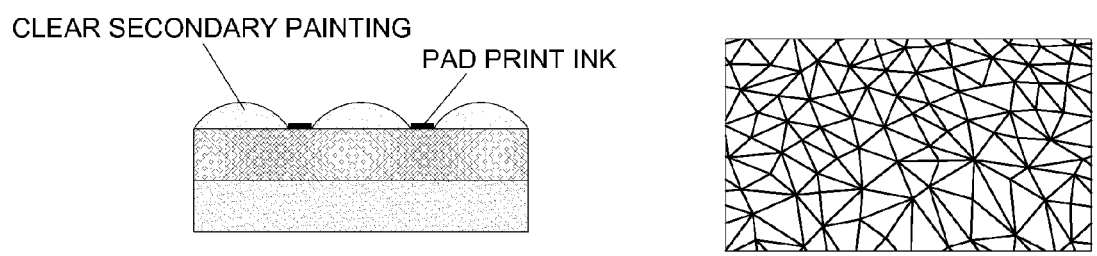
FIG. 2 illustrates an exemplary surface of an exemplary coating with an exemplary triangular embossed pattern formed using an exemplary ink composition according to an exemplary embodiment of the present invention.

FIG. 2 illustrates the surface of a coating with a triangular embossed pattern formed using an exemplary ink composition. For example, colored printing lines may be formed on 'the sides of the triangle' which are the ink printed surfaces, and embossments are formed on a transparent layer which constitutes 'the surfaces of the triangle' by using the clear paint.

The printing in step (i) may be, but not limited to, a pad printing, screen printing, or tempo printing. In particular, the pad printing may be performed for the printing step (i) since a curved surface portion of the vehicle interior part may be printed with the patterns by the pad printing.

Figure 3:
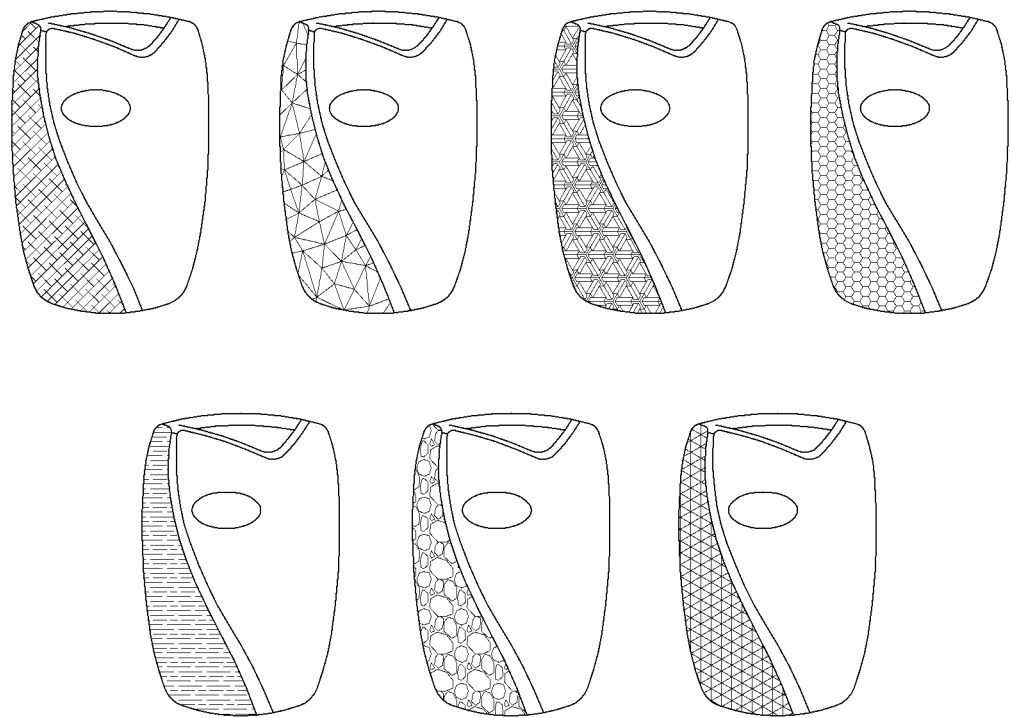
FIG. 3 illustrates various exemplary patterns processed on exemplary curved surface portions of vehicle keys using an exemplary ink composition according to an exemplary embodiment of the present invention.

Meanwhile, FIG. 3 illustrates various exemplary shapes of exemplary embossments implemented on exemplary vehicle keys through the method for forming an embossed pattern according to various exemplary embodiments of the present invention. For example, transparent embossments, colored embossments, and the like with various patterns may be implemented even on the curved surface portions.

Accordingly, the ink composition according to various exemplary embodiments of the present invention may provide a transparent embossing, and further provide advantages of various embossed patterns which may be implemented with one injection mold, since embossing may be formed by printing and painting on a smooth injection-molded body. Moreover, a process of removing the residue may be eliminated, thereby substantially improving the workability. Accordingly, various exemplary ink compositions may be widely applied to materials on which embossments may be implemented to impart aesthetic appreciation to the external appearance, such as vehicle interior parts as well as electric and electronic products, and the like.

Hereinafter, the present invention will be described in more detail with reference to Examples. However, the following Examples are set forth to illustrate the present invention, but the scope of the present invention is not limited thereto.

EXAMPLES

The following examples illustrate the invention and are not intended to limit the same.

Examples 1 and 2 and Comparative Examples 1 to 14

Ink compositions for Examples 1 and 2 and Comparative Examples 1-14 were prepared according to compositions shown in Tables 1 to 3.

TABLE 1

Components and Contents of Ink Compositions in Examples 1 and 2

| | Classification | Example 1 | Example 2 |
|---|---|---|---|
| Unit: wt % | Silane-modified polyacrylate resin [1] | 30 | 30 |
| | Silicone-modified polyacrylate resin [2] | 55 | 50 |
| | Silicone oil-type additive [3] | 5 | 5 |
| | Silicone oil compound-type additive [4] | 10 | 15 |
| | Total [5] | 100 | 100 |
| Unit: parts by weight | Curing agent [6] | 20 | 20 |
| | Solvent [7] | 15 | 15 |

[1] RAU-PS12 manufactured from Anick Co., Ltd.
[2] SILCLEAN 3700 manufactured from BYK Co., Ltd.
[3] KF-96 manufactured from ShinEtsu Co., Ltd.
[4] KS66 manufactured from ShinEtsu Co., Ltd.
[5] to [7] A curing agent and a solvent were additionally used in an amount relative to 100 parts by weight when 100 wt % of the ink compositions in [1] to [4] is set to 100 parts by weight.
[6] N-3300 manufactured from Bayer Co., Ltd.,
[7] Ethylene glycol monobutyl ether

TABLE 2

Components and Contents of Ink Compositions in Comparative Examples 1 to 7

| | | Comparative Example | | | | | | |
|---|---|---|---|---|---|---|---|---|
| | Classification | 1 | 2 | 3 | 4 | 5 | 6 | 7 |
| Unit: wt % | Silane-modified polyacrylate resin [1] | — | 10 | 20 | 30 | 40 | 50 | 30 |
| | Silicone-modified polyacrylate resin [2] | 100 | 90 | 80 | 70 | 60 | 50 | 69 |
| | Silicone oil-type additive [3] | — | — | — | — | — | — | 1 |
| | Silicone oil compound-type additive [4] | — | — | — | — | — | — | — |
| | Total [5] | 100 | 100 | 100 | 100 | 100 | 100 | 100 |
| Unit: Parts by weight | Curing agent [6] | 20 | 20 | 20 | 20 | 20 | 20 | 20 |
| | Solvent [7] | 15 | 15 | 15 | 15 | 15 | 15 | 15 |

[1] RAU-PS12 manufactured from Anick Co., Ltd.
[2] SILCLEAN 3700 manufactured from BYK Co., Ltd.
[3] KF-96 manufactured from ShinEtsu Co., Ltd.
[4] KS66 manufactured from ShinEtsu Co., Ltd.
[5] to [7] A curing agent and a solvent were additionally used in an amount relative to 100 parts by weight when 100 wt % of the ink compositions in [1] to [4] is set to 100 parts by weight.
[6] N-3300 manufactured from Bayer Co., Ltd.
[7] Ethylene glycol monobutyl ether

TABLE 3

Components and Contents of Ink Compositions in Comparative Examples 8 to 14

| | | Comparative Example | | | | | | |
|---|---|---|---|---|---|---|---|---|
| | Classification | 8 | 9 | 10 | 11 | 12 | 13 | 14 |
| Unit: wt % | Silane-modified polyacrylate resin [1] | 30 | 30 | 30 | 30 | 30 | 30 | 30 |
| | Silicone-modified polyacrylate resin [2] | 67 | 65 | 63 | 60 | 64 | 60 | 45 |
| | Silicone oil-type additive [3] | 3 | 5 | 7 | 10 | 5 | 5 | 5 |
| | Silicone oil compound-type additive [4] | — | — | — | — | 1 | 3 | 20 |
| | Total [5] | 100 | 100 | 100 | 100 | 100 | 100 | 100 |
| Unit: Parts by weight | Curing agent [6] | 20 | 20 | 20 | 20 | 20 | 20 | 20 |
| | Solvent [7] | 15 | 15 | 15 | 15 | 15 | 15 | 15 |

[1] RAU-PS12 manufactured from Anick Co., Ltd.
[2] SILCLEAN 3700 manufactured from BYK Co., Ltd.
[3] KF-96 manufactured from ShinEtsu Co., Ltd.
[4] KS66 manufactured from ShinEtsu Co., Ltd.
[5] to [7] A curing agent and a solvent were additionally used in an amount relative to 100 parts by weight when 100 wt % of the ink compositions in [1] to [4] is set to 100 parts by weight.
[6] N-3300 manufactured from Bayer Co., Ltd.
[7] Ethylene glycol monobutyl ether

TEST EXAMPLES

Test Example 1

Evaluation of Lasting Embossment and Physical Properties

An embossed pattern was formed by preparing the ink compositions according to materials and composition ratios shown in Tables 1 to 3, and the pattern was formed by pad printing on a primary base painting, and then performing a secondary printing treatment with a clear paint on the primary base painting with the printed pattern or surface.

Furthermore, measurement results of the lasting embossment and other physical properties were shown by using the methods described below.

(1) Evaluation of Lasting Embossment: Formation embossment was evaluated through the criteria of the base coat clear residual amount in the embossed pattern ink coating (2) Evaluation of Light Resistance: A painting specimen was irradiated under the xenon arc lamp under the conditions of a black panel temperature of about 89±3° C., an in-chamber humidity of about 50±5% RH, an illumination intensity of about 0.55±0.02 W/m² (at a wave length of about 340 nm) until the total cumulative quantity of light became about 700 KJ/m², taken out, washed with a neutral detergent aqueous solution, and dried with air to evaluate the external appearance and the adhesion properties by the following method for evaluating the initial adhesion properties (3).

(3) Evaluation of Initial Adhesion Properties: A cross-cut was performed on a painting specimen in the horizontal and vertical directions with each of about 11 cuts at an interval of about 2 mm, in accordance with standard ASTM D3359 tape adhesion test method and then the surface was cleaned with a soft brush and firmly adhered using a predetermined tape with suitable width and length, and the tape was strongly pulled in a direction at an angle of about 90° to observe the degree of the peeled-off portion.

(4) Evaluation of scratch resistance: A load of about 500 g was applied to a sapphire tip having a shape of about 0.5 R to generate scratches on the surface at a speed of about 100 mm/sec, and then the degree of scratch was observed to measure the scratch resistance.

(5) Evaluation of Sun Cream Resistance: About 0.25 g of a sun cream was applied to the entire surface of the test specimen, the resulting test specimen was left to stand in a constant temperature bath at about 80±2° C. for 1 hour and taken out, left to stand at room temperature for about 10 to 15 minutes, and then washed with a neutral detergent and dried. The surface state of the coating was investigated, and the adhesion properties were immediately evaluated three times by the method for evaluating the initial adhesion properties (3).

(6) Evaluation of Moisture Resistance: A test specimen was left to stand in a chamber under the conditions of a test temperature of about 50±2° C. and a relative humidity of about 95±2% RH for about 168 hours, and then taken out to evaluate the external appearance and the adhesion properties by the method for evaluating the initial adhesion properties (3).

(7) Evaluation of Abrasion Resistance: The upper cross-section of the test specimen was evaluated at a speed of about 30 reciprocations/min along a distance of about 100±5 mm by using a canvas (TOYOSYNTHETIC CH 2010). In this case, a load applied on the test specimen was maintained at about 500 g to evaluate the abrasion degree of the painted surface of the test specimen through the external appearance after about 10,000 times repetition.

(8) Evaluation of Chemical Resistance (Ethanol/Gasoline): A cotton cloth soaked with ethyl alcohol (about 95% or greater) and unleaded gasoline was reciprocated about 10 times with a force of about 4.9 N or 0.5 kgf to rub the surface of the coating to investigate the external appearance with the eyes. Thereafter, the test specimens are left to stand at room temperature for about 1 hour and stand in a constant temperature chamber under the condition of about 80±2° C. for about 3 hours, and then are taken out to investigate the surface state of the coating.

TABLE 4

Results of Physical Properties of Ink Compositions in Examples 1 and 2

| Classification | Example 1 | Example 2 |
|---|---|---|
| Pattern reproducibility | ◎ | ◎ |
| Light resistance | ◎ | ◎ |
| Initial adhesion properties | ◎ | ◎ |
| Scratch resistance | ◎ | ◎ |
| Sun cream resistance | ◎ | ◎ |
| Moisture resistance | ◎ | ◎ |
| Abrasion resistance | ◎ | ◎ |
| Chemical resistance (Ethanol) | ◎ | ◎ |
| Chemical Resistance (Gasoline) | ◎ | ◎ |

◎: Excellent

TABLE 5

Results of Physical Properties of Ink Compositions in Comparative Examples 1 to 7

| Classification | 1 | 2 | 3 | 4 | 5 | 6 | 7 |
|---|---|---|---|---|---|---|---|
| Pattern reproducibility | ○ | ○ | Δ | Δ | Δ | X | Δ |
| Light resistance | — | — | — | — | — | — | — |
| Initial adhesion properties | X | X | ◎ | ◎ | ◎ | ◎ | ◎ |
| Scratch resistance | — | — | — | — | — | — | — |
| Sun cream resistance | — | — | — | — | — | — | — |
| Moisture resistance | — | — | — | — | — | — | — |
| Abrasion resistance | — | — | — | — | — | — | — |
| Chemical resistance (Ethanol) | — | — | — | — | — | — | — |
| Chemical Resistance (Gasoline) | — | — | — | — | — | — | — |

◎: Excellent
○: Good
Δ: Fair
X: Vulnerable
—: When the pattern reproducibility was not evaluated as very excellent (◎) in terms of implementation, additional physical property experiments need not be performed, and thus were not performed.

TABLE 6

Results of Physical Properties of Ink Compositions in Comparative Examples 8 to 14

| Classification | 8 | 9 | 10 | 11 | 12 | 13 | 14 |
|---|---|---|---|---|---|---|---|
| Pattern reproducibility | ○ | ○ | ○ | Δ | ○ | ○ | ○ |
| Light resistance | — | — | — | — | — | — | — |
| Initial adhesion properties | ◎ | ◎ | ◎ | ◎ | ◎ | ◎ | ◎ |
| Scratch resistance | — | — | — | — | — | — | — |
| Sun cream resistance | — | — | — | — | — | — | — |
| Moisture resistance | — | — | — | — | — | — | — |
| Abrasion resistance | — | — | — | — | — | — | — |
| Chemical resistance | — | — | — | — | — | — | — |

TABLE 6-continued

Results of Physical Properties of Ink Compositions in Comparative Examples 8 to 14

| Classification | Comparative Example | | | | | | |
|---|---|---|---|---|---|---|---|
| | 8 | 9 | 10 | 11 | 12 | 13 | 14 |
| (Ethanol) Chemical Resistance (Gasoline) | — | — | — | — | — | — | — |

◎: Excellent
○: Good
Δ: Fair
X: Vulnerable
—: When the pattern reproducibility was not evaluated as excellent (◎) in terms of implementation, additional physical property experiments need not be performed, and thus were not performed.

As shown in Tables 4 to 6, the ink compositions in Examples 1 and 2 according to exemplary embodiments of the present invention may have greater formation of embossment, adhesion force and the like substantially greater than those in Comparative Examples 1 to 14.

Test Example 2

Confirmation of Clear Residue Amount According to the Kind of Resin

A general ink resin for printing and a silane-modified polyacrylate resin (RAU-PS12 manufactured by Anick Co., Ltd.) were compared. In order to consider only effects from the resins, a solvent and a resin were used in mixtures without any additives. Table 7 shows Comparative Examples A-D and indicates resins used and the amounts thereof, and the results of the formation of the embossment.

As shown in Table 7, when the silane-modified polyacrylate resin (RAU-PS12 manufactured by Anick Co., Ltd.) was used, the clear residue was partially generated on the printed surface, but for the remaining acrylic lacquer resin, acrylic polyol resin, and polyester resin, the printed surfaces were all covered with the clear paint. As such, a silane-modified polyacrylate resin may improve formation of embossment due to water-repellency and oil-repellency obtained from the ink composition of the invention.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. An ink composition for improving formation of embossments, comprising:
    a silane-modified polyacrylate resin in an amount of about 10 to 40 wt% based on the total weight of the ink composition;
    a silicone-modified polyacrylate resin in an amount of about 50 to 80 wt% based on the total weight of the ink composition;
    a dimethyl silicone oil solution in an amount of about 3 to 7 wt% based on the total weight of the ink composition; and
    a silicone oil compound additive in an amount of about 5 to 15 wt%,
    based on the total weight of the ink composition.

2. The ink composition of claim 1, further comprising:
    a curing agent in an amount of about 10 to 30 parts by weight; and
    a solvent in an amount 1 to 30 parts by weight,

TABLE 7

| Classification | | Comparative Example A | Comparative Example B | Comparative Example C | Comparative Example D |
|---|---|---|---|---|---|
| Resin | Acrylic lacquer [1] (RAC-N140) | 50 | — | — | — |
| | Acrylic polyol [2] (RAU-1048) | — | 50 | — | — |
| | Polyester [3] (REX-CP80) | — | — | 50 | — |
| | Silane-modified polyacrylate [4] (RAU-PS-12) | — | — | — | 50 |
| Solvent | Normal butyl acetate | 50 | 50 | 50 | 50 |
| | Total | 100 | 100 | 100 | 100 |
| Curing agent | Isocyanate-based curing agent [5] (N-3300) | 20 | 20 | 20 | 20 |
| | Emboss implantation power | Pattern covered (impossible to implement) | Pattern covered (impossible to implement) | Pattern covered (impossible to implement) | Residue generated in pattern part (Partially implemented) |

[1] A general resin RAC-N140 (manufactured by Anick Co., Ltd., a molecular weight of about 50,000 to 60,000, and $T_g$ of about 73° C.) for a single liquid type acrylic lacquer is a resin which has a resin solid content of 40% and contains isobutyl acetate/toluene/isobutanol.
[2] The acrylic polyol (manufactured by Anick Co., Ltd., a molecular weight of about 5,000 to 10,000, and $T_g$ of about 58° C.) has a resin solid content of 50% and includes toluene/xylene.
[3] The polyester (manufactured by Anick Co., Ltd., and a molecular weight of about 5,000 to 10,000) has a resin solid content of about 80% and contains a methyl isobutyl ketone solvent.
[4] The silane-modified polyacrylate resin (RAU-PS12 manufactured by Anick Co., Ltd.) is a resin which has a solid content of 50% and includes normal butyl acetate.
[5] Bayer Co., Ltd., NCO % of about 21 to 22
* When 100 wt % of the resin and the solvent is set to 100 parts by weight, the curing agent was additionally used in relative parts by weight.

wherein said parts by weight are based on 100 parts of the ink composition by weight, wherein the curing agent is one or more isocyanate-based curing agents selected from the group consisting of hexamethylene diisocyante, toluene diisocyanate, and isopropyl diisocyanate.

3. The ink composition of claim 1, wherein the silane-modified polyacrylate resin has a glass transition temperature of - about −20to 40 °C.

4. The ink composition of claim 1, wherein a content of silicone in the silicone-modified polyacrylate resin is in an amount of about 10 to 50 wt% based on the total weight of the silicone-modified polyacrylate resin.

5. A method of forming an embossed pattern using the ink composition of claim 1, comprising steps of:
   (i) performing a pattern printing on a primary base painting by using the ink composition; and
   (ii) performing a secondary painting treatment with a clear paint on the primary base painting with the printed pattern.

6. The method of claim 5, wherein the printing in step (i) is performed by one of pad printing, screen printing, or tempo printing.

7. The method of claim 5, wherein the clear paint in step (ii) is painted on a non-printed surface to implement an embossed pattern.

8. A plastic part in which an embossed pattern is implemented by the method of claim 5.

9. The plastic part of claim 8, wherein the plastic part is used for an interior of a vehicle.

* * * * *